United States Patent [19]

Landau

[11] 3,976,506

[45] Aug. 24, 1976

[54] PRESSURIZED FUEL CELL POWER PLANT WITH AIR BYPASS

[75] Inventor: Michael B. Landau, West Hartford, Conn.

[73] Assignee: United Technologies Corporation, Hartford, Conn.

[22] Filed: Feb. 12, 1975

[21] Appl. No.: 549,598

[52] U.S. Cl. .............................. 136/86 R; 136/86 C
[51] Int. Cl.² ............................................ H01M 8/06
[58] Field of Search .............. 136/86 A, 86 R, 86 B, 136/86 C

[56] References Cited
UNITED STATES PATENTS

| | | | |
|---|---|---|---|
| 668,838 | 2/1901 | Lavison | 136/86 A |
| 1,182,759 | 5/1916 | Emanuel | 136/86 R |
| 3,112,229 | 11/1963 | Bacon et al. | 136/86 R |
| 3,311,097 | 3/1967 | Mittelsteadt | 123/119 |
| 3,404,529 | 10/1968 | Lagerstrom | 60/6 |
| 3,507,702 | 4/1970 | Sanderson | 136/86 R |
| 3,615,850 | 10/1971 | Chludzinski | 136/86 C |

Primary Examiner—John H. Mack
Assistant Examiner—H. A. Feeley
Attorney, Agent, or Firm—Stephen E. Revis

[57] ABSTRACT

A power plant for producing electricity uses fuel cells run on pressurized air and pressurized fuel. The air is compressed by compressor apparatus which is driven by waste energy in the form of hot pressurized gases produced in the power plant. In one embodiment the compressor apparatus includes a turbine operably connected to a compressor for driving the same. At part power, in order to maintain the pressure of the air being fed to the cells while reducing the amount of air fed to the cells, a portion of the compressed air is bypassed around the fuel cells, is increased in temperature using an auxiliary burner, and is delivered into the turbine to help drive the compressor. By doing this the mass flow of air through the cells may be reduced without reducing the mass flow of gases into the turbine thereby maintaining the speed of the compressor at part power.

17 Claims, 4 Drawing Figures

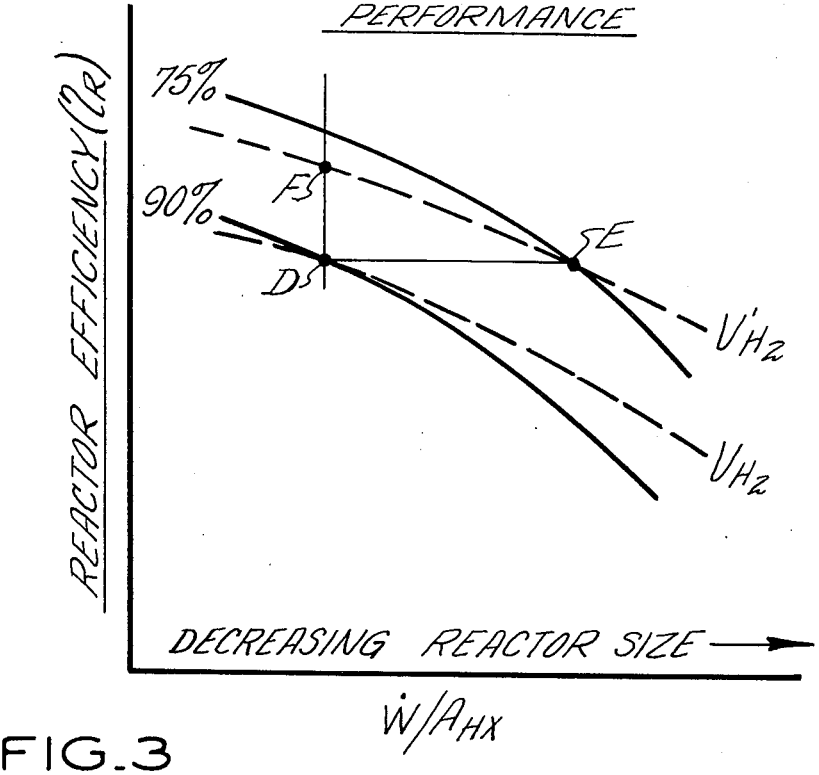
FIG. 4 STEAM REFORMER REACTOR PERFORMANCE
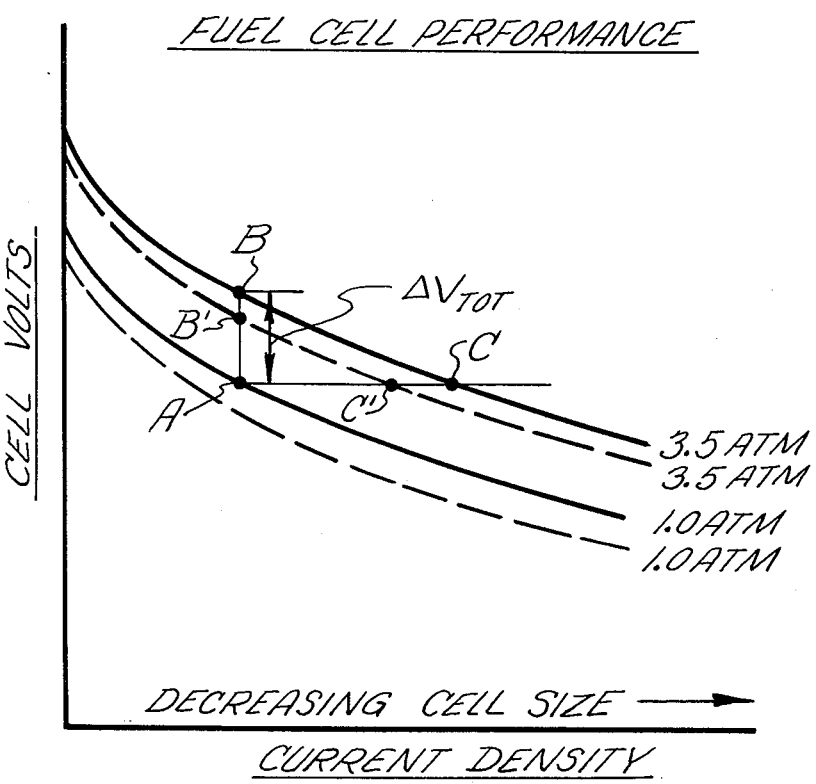
FIG. 3 FUEL CELL PERFORMANCE

PRESSURIZED FUEL CELL POWER PLANT WITH AIR BYPASS

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high pressure reactants in the fuel cell stack. For the foregoing reasons, up to the present time, these fuel cell power plants have always used reactants at atmospheric pressures.

RELATED APPLICATIONS

The following applications, filed on even date herewith and of common assignee, pertain to subject matter related to the present invention:

1. "Pressurized Fuel Cell Power Plant" by D. Bloomfield and R. Cohen, U.S. Ser. No. 549,600.
2. "Pressurized Fuel Cell Power Plant" by D. Bloomfield, U.S. Ser. No. 549,601.
3. "Pressurized Fuel Cell Power Plant With Steam Flow Through The Cells" by D. Bloomfield and M. Landau, U.S. Ser. No. 549,596.
4. "Pressurized Fuel Cell Power Plant" by M. Menard, U.S. Ser. No. 549,597.
5. "Pressurized Fuel Cell Power Plant With Single Reactant Gas Stream" by D. Bloomfield, U.S. Ser. No. 549,602.
6. "Pressurized Fuel Cell Power Plant With Steam Powered Compressor" By D. Bloomfield, U.S. Ser. No. 549,599.

SUMMARY OF THE INVENTION

One object of the present invention is a fuel cell power plant using high pressure reactants and having significant advantages during full power operation and which may be operated at part power with little detraction from those advantages.

Accordingly, the present invention is an electricity generating power plant using fuel cells wherein the air is supplied to the fuel cells at high pressure from a compressor which is driven, at least in part, by energy from the fuel cell effluent gases and fuel conditioning apparatus waste heat; the pressure of the air fed to the cells is maintained the same at part and full power by bypassing a portion of the compressed air around the fuel cells and through the turbine, and by using an auxiliary burner to add additional heat to the gases entering the turbine.

In a fuel cell power plant according to a preferred embodiment of the present invention it is contemplated that the cathode air will be increased in pressure by a fixed geometry compressor driven by a fixed geometry turbine. The turbine is driven by effluent gases from the fuel cell and from a burner to a steam reforming reactor. At full power fuel cell operation the compressor puts out a certain mass flow of air at a certain pressure based on the energy in the effluent gases flowing through the turbine and the design of the turbocharger. Many advantages of the power plant of the present invention are the result of using high pressure reactants in the fuel cell. These advantages will be explained in more detail in the Description of the Preferred Embodiments.

It is not always necessary or desirable to run the power plant at full power; however, if the advantages of the power plant are to be maintained at their maximum level, it is necessary that the fuel cell reactants be maintained at the same high pressure during part power operation as at full power operation; also, at the same time, it is necessary to reduce the mass flow of air through the cathode gas spaces of the fuel cells, otherwise it will be very difficult, if not impossible, to condense out a sufficient amount of water from the fuel cell effluent gas streams to run a steam reforming reactor as will also be more fully explained in the Description of the Preferrred Embodiments. However, a fixed geometry turbocharger does not have the capability of providing the same high pressure from the compressor at lower mass flow rates; and, it is not capable of providing these pressures and flow rates with lesser and cooler air flows into the turbine. A power plant designed according to the present invention resolves these problems by bypassing, at part power operation, a portion of the compressed air around the fuel cell and through the turbine. Thus, the mass flow through the turbine is substantially the same at both part power and full power, which is required if the compressor is to be driven at the same speed at both part power and full power. Also, the present invention contemplates the use of an auxiliary burner at part power to increase the temperature of the gases entering the turbine so that the amount of heat therein, as well as the mass flow rate thereof, is about the same at part power as at full power.

The foregoing and other objects, features and advantages of the present invention will be more fully explained and will become more apparent in the light of the following detailed description of preferred embodiments thereof as illustrated in the accompanying drawing.

BRIEF DESCRIPTION OF THE DRAWING

FIG. 3 is a graph illustrating the performance of fuel cells used in power plants of the present invention.

FIG. 4 is a graph illustrating the performance of steam reforming reactors used in power plants of the present invention.

DESCRIPTION OF THE PREFERRED EMBODIMENTS

Figure 1:
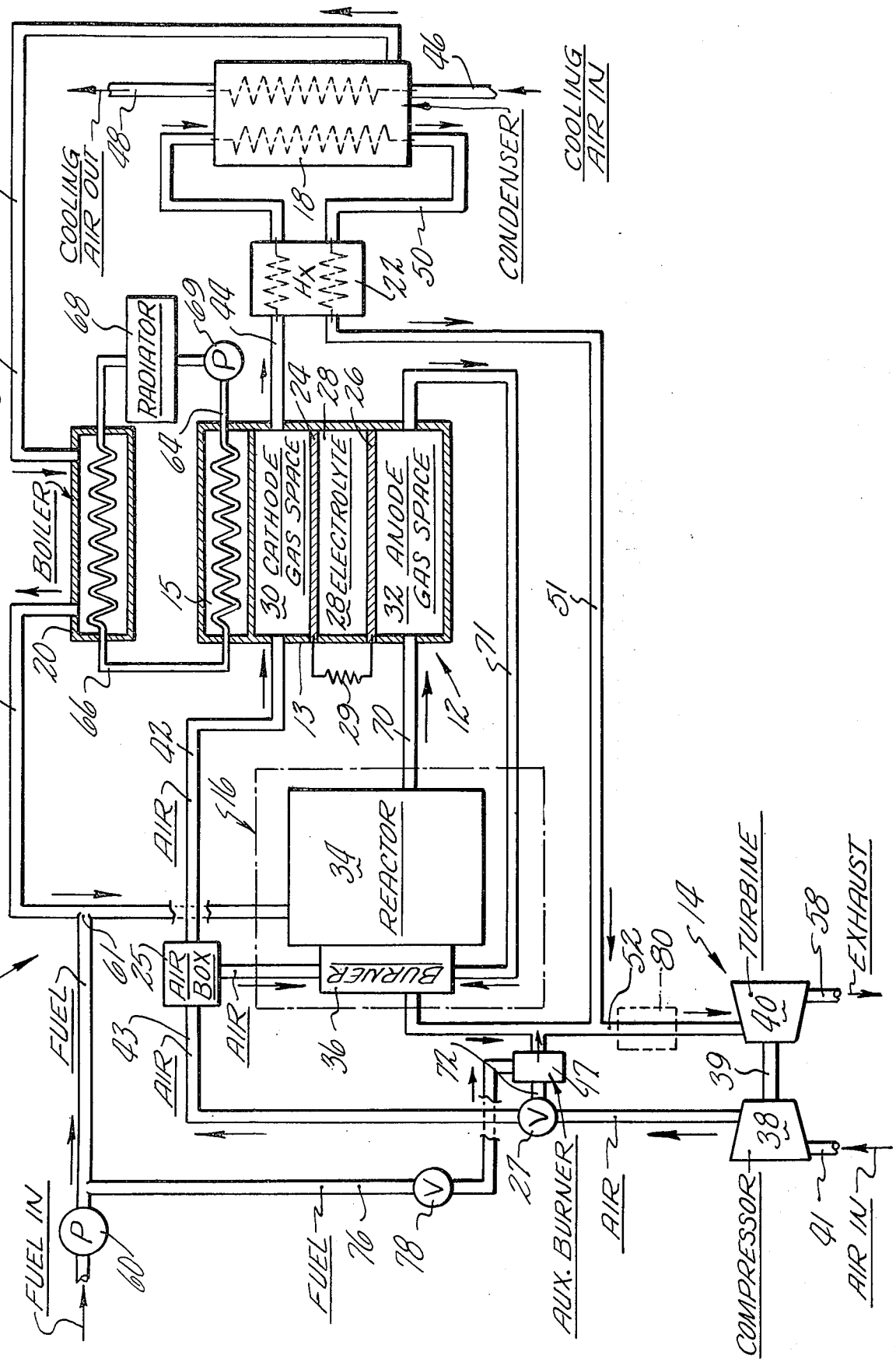
FIG. 1 is a schematic of a power plant according to the present invention.

Consider, as an exemplary embodiment of the present invention, the power plant depicted schematically in FIG. 1. The power plant is generally designated by the numeral 10 and includes a fuel cell stack generally designated by the numeral 12, compressor apparatus generally designated by the numeral 14, fuel conditioning apparatus generally designated by the numeral 16, an auxiliary burner 17, a condenser 18, a boiler 20, a regenerator 22, and an air flow splitter or air control box 25. The fuel cell stack 12 may comprise any conventional type of fuel cells which operate on gaseous reactants. In this embodiment the oxidant is air and the fuel is hydrogen.

The stack 12 will generally comprise a plurality of fuel cells connected in series electrically through a load, but is herein depicted as only comprising a single cell 13 for the purpose of clarity and a thermal management portion 15. As herein shown each cell includes a cathode electrode 24 spaced from an anode electrode 26 and including an electrolyte retaining matrix 28 therebetween. In this preferred embodiment the electrolyte is liquid phosphoric aicd ($H_3PO_4$) but the invention is not intended to be limited thereto and base electrolytes as well as solid types of electrolytes such as metal oxide electrolytes or solid polymer electrolytes are contemplated as being useful in a power plant designed according to the present invention. The electrodes 24, 26 are connected in series through a load 29. Each cell 13 also includes a cathode gas space 30 on the nonelectrolyte side of the cathode electrode 24 and an anode gas space 32 on the nonelectrolyte side of the anode electrode 26. In this embodiment the fuel conditioning apparatus 16 comprises a steam reformer reactor 34 and a reactor burner 36. It is also comtemplated that the fuel conditioning apparatus 16 may include additional equipment such as a selective oxidizer and a shift converter. Although these components are not shown, they could readily be incorporated into the power plant and would not detract from the invention herein described. The compressor apparatus 14 is a turbocharger comprising a compressor 38 driven by a turbine 40 through a shaft 39, and will be described hereinafter in more detail as will other components of the power plant 10.

Still referring to FIG. 1, in operation air enters the compressor 38 via conduit 41, and is compressed. Any pressure greater than atmospheric pressure will yield some benefits as compared to unpressurized power plants; however, about two or higher atmospheres of pressure are desirable in order that substantial benefits are realized for the total power plant. This pressurized air passes through a bypass control valve 27 and enters the air box 25 via conduit 43. Assume for the moment, that the valve 27 is in a position which directs all the air from the compressor 38 into the air box 25, which will be the case when the power plant is running at full power. The air box includes controls and valves for properly proportioning the air flow to various components. A portion is directed into the cathode gas space 30 via conduit 42 and is electrochemically reacted within the cathode electrode 24 with the phosphoric acid electrolyte in the matrix 28 to produce electricity and water, some of the water being evaporated back into the air stream flowing through the cathode gas space 30. The moist, hot, cathode effluent leaves the gas space 30 via conduit 44 and passes through the regenerator 22 and thence through the condenser 18. Cooling air enters the condenser 18 via conduit 46 and leaves in a heated condition via conduit 48. Within the condenser 18 the cathode effluent is cooled to the point where water condenses out and is collected for use in the fuel conditioning apparatus 16 as will be hereinafter discussed. The relatively cool cathode effluent leaves the condenser via conduit 50 and passes back through the regenerator 22 where it recovers some of its lost heat. The reheated cathode effluent leaves the regenerator 22 via conduit 51 where it is combined with the effluent gas stream from the reactor burner 36 and passes therewith via conduit 52 into the turbine 40, thereby providing part of the energy powering the turbine 40 which in turn drives the compressor 38. After passing through the turbine 40 any further energy in the gas stream may be either thrown away via conduit 58 or may be used elsewhere in the power plant.

On the anode side, a hydrogen containing liquid fuel such as naphtha, which has been increased in pressure by pump 60 to about the same pressure as the air entering the cathode gas space 30, is mixed with pressurized steam at 61 from the boiler 20 and enters the steam reforming reactor 34 via conduit 62. Although not shown, it is preferable that the fuel be atomized as it is combined with the steam at 61 so that the stream entering the reactor 34 is in the vapor state. Although the fuel conditioning apparatus is shown comprising only a steam reforming reactor and reactor burner, it is contemplated that the fuel conditioning apparatus of power plants designed according to the present invention may include other components such as a shift converter and/or a selective oxidizer. The requirements of the fuel conditioning apparatus are dependent in part upon the type of raw fuel being used and upon the particular design of the cells in the fuel cell stack. Indeed, the fuel conditioning apparatus may include a partial oxidation hydrogen generator instead of a steam reforming reactor and reactor burner.

The boiler 20 may be provided with its own burner and fuel supply if desired, but as herein shown in this preferred embodiment the boiler 20 is run on waste heat produced by the stack 12. As shown, a coolant, such as a silicone oil, enters the thermal management portion 15 of the stack 12 via conduit 64, picks up heat generated by the stack 12 and leaves via conduit 66. Water from the condenser 18 is introduced into the boiler 20 via conduit 67. The coolant fluid enters the boiler 20 and gives up its heat to the water in the boiler to produce steam. The coolant fluid leaves the boiler 20 and enters a radiator 68 where additional heat may be rejected before the coolant is pumped back to the stack 12 by pump 69.

Processed fuel in the form of hydrogen gas and possibly some impurities leaves the steam reforming reactor 34 by means of conduit 70 whereupon it enters the anode gas space 32 of the fuel cell 13 where it electrochemically reacts with the electrolyte. In this embodiment the anode gas stream is contemplated as being at about the same pressure as the cathode gas stream in order to minimize the risk of gas crossover between the anode and cathode gas spaces. The effluent from the anode gas space 32 is fed to the burner 36 via conduit 71. The anode gas stream effluent contains enough unburned hydrogen gas such that there is no need for the burner 36 to have a separate fuel supply. The burner 36 provides the heat for the reactor 34. The burner effluent, which includes the anode gas stream effluent, is combined with the cathode gas stream effluent as heretofore stated whereupon it enters the turbine 40 via conduit 52.

Although in the embodiment of FIG. 1 the anode gas space effluent is shown entering the burner 36 and providing the fuel therefor, it may be desirable to provide the burner 36 with its own supply of fuel and not to pass the effluent from the anode gas space into the burner 36 but to combine it directly with the effluent from the cathode gas space in the conduit 51; or, it may be combined with the effluent in the conduit 44 so that it would also pass through condenser 18 and water would be removed therefrom in addition to the water removed from the cathode gas space effluent.

In this embodiment waste energy from the fuel conditioning apparatus is delivered to the turbine by passing the reactor burner effluent gases into the turbine. If the power plant had not steam reforming reactor and thus no reactor burner other means would have to be provided for delivering waste energy from the fuel conditioning apparatus into the turbine, such as by a heat exchanger in operable relationship with the fuel conditioning apparatus and with any other gas stream being delivered into the turbine.

Figure 2:
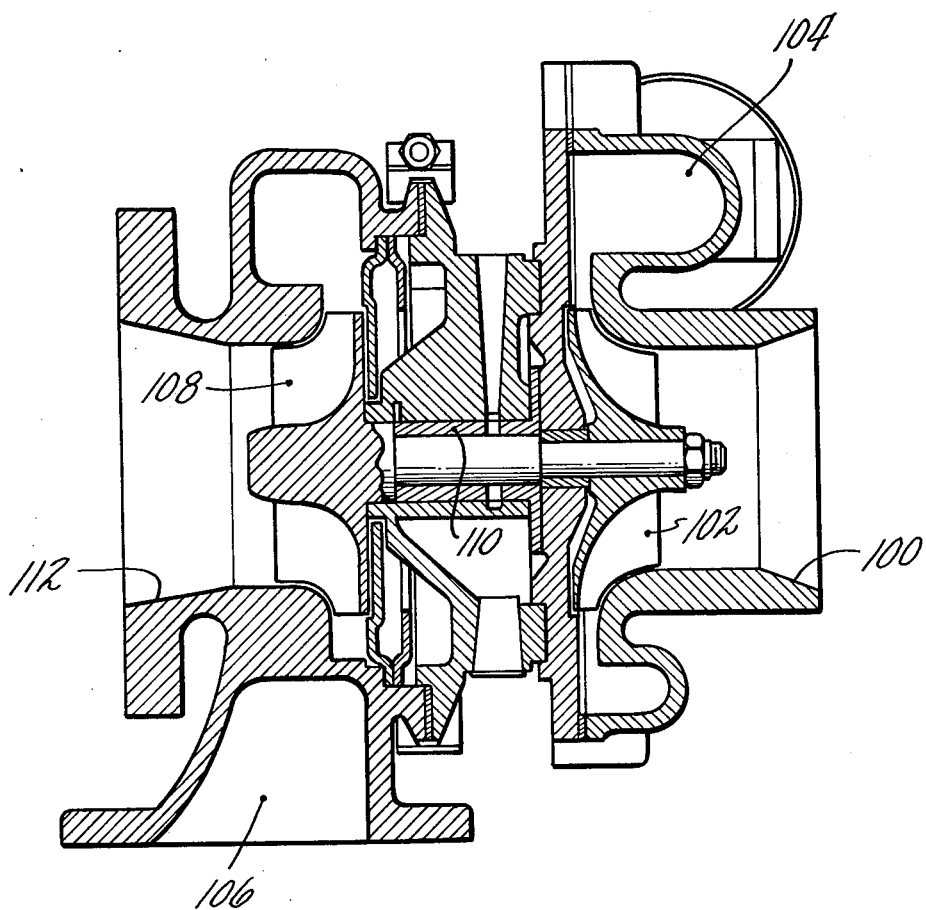
FIG. 2 is a cross-sectional view of a turbocharger which may be used in power plants of the present invention.

As an example of a turbocharger suitable for use in a power plant designed according to the present invention, consider the turbocharger shown in FIG. 2. Ambient air enters a compressor duct 100, and impinges upon a single stage centrifugal impeller 102 which imparts a velocity head to the air. The high velocity air flows into a diffuser 104 where the velocity head is changed to a pressure head. In the embodiment of FIG. 1 the compressed air would leave the diffuser 104 via conduit 43 and, after passing through the air box 25, would be introduced into the cathode gas space 30. On the other side, hot gases enter a turbine inlet 106 (such as from conduit 52 in FIG. 1) and flow through a centrifugal turbine rotor 108 which converts the thermal energy of the gas stream to shaft horsepower to drive a shaft 110 connected to the compressor impeller 102. The gases are exhausted via a turbine outlet duct 112.

The turbocharger pictured in FIG. 2 is only illustrative of the type of device preferred for use in the power plants of the present invention. Any commercially available turbocharger of a size sufficient to provide the required flow rate and pressure needed by the fuel cell stack chosen for use in the power plant may be useed. For example, for a 1200 kilowatt power plant wherein it is desired that the reactant gases to the fuel cell stack are to be at about 3.5 atmospheres pressure, a Brown Boveri model RR150 turbocharger would be suitable. This particular model has the capability of providing a mass flow rate of up to 3.0 lb/sec at 50 psia. Although the term "turbocharger" is usually associated with a centrifugal compressor, as used herein it is intended to encompass an axial flow compressor as well. Centrifugal compressor are preferred because they have the advantage of high efficient and high single-stage compression ratios not usually available with axial flow compressors. Also, although the turbocharger of FIG. 2 shows a centrifugal turbine, it is also contemplated that turbochargers using axial flow turbines may be used in power plants of the present invention.

Although what is pictured in FIG. 2 is representative of what is typically referred to in the art as a "turbocharger" the present invention is not intended to be limited thereto but may be any apparatus which uses the energy of a hot pressurized gas stream (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct tranmission of energy from an expanding gas utilizing compression and expansion waves, or other device which works on similar principles, may be used. The Comprex supercharging concept is well known in the art and is more fully described in an ASME paper No. 58-GTP-16 titled "The Comprex ... A New Concept of Diesel Supercharging" by Max Berchtold and F. J. Gardiner published in March 1958.

Assume, now, that it is desired to run the power plant at part power. As heretofore discussed, the advantages of a power plant according to the present invention are dependent upon the use of high pressure reactants in the stack 12. In order to maximize benefits that may be obtained from such a power plant, it is also necessary that the reactants supplied to the stack be at the same high pressure during part power operation as a full power operation.

For the fixed geometry turbocharger 14 to pump out compressed air at the same high pressure as during full power operation, the mass flow through the turbine 40 and the temperature of the gases flowing through the turbine 40 must be about the same at part power operation as at full power operation. Any reduction in the energy of the gases entering the turbine 40 will result in a slower speed of the turbine 40 and consequently a reduction in the pressure of the air as well as in the mass flow of air pumped out by the compressor 38.

When the fuel cell is run at part power less water is produced according to Faraday's law. If the mass flow of air flowing through the cathode gas space is not reduced during part power, then, since less water is being produced in the cell, the partial pressure of water in the cathode gas stream will be significantly lower than at full power. This may make it extremely difficult, if not impossible, to lower the temperature of the gas stream leaving the cathode gas space to the temperature necessary to condense out sufficient water for the reactor 34. The reason for this is that power plants of the present embodiment must generally be designed to be able to utilize ambient air at a temperature of about 90°F as the coolant in the condenser. A very low partial pressure of water vapor in the gas stream flowing through the condenser will either make it impossible to condense out sufficient water using ambient air or would require a prohibitively large condenser.

It is also desirable to run the stack at the same temperature at part power as at full power. The stack does not produce as much heat at part power as at full power, and if too much air is flowing through the stack at part power it might remove too much heat from the stack such that the stack runs too cool. This might require the use of an auxiliary burner to heat the stack to an efficient operating temperature.

It might be considered that a solution would be to deliver the excess air into the reactor burner 36 via the air control box 25. However, at part power the stack 12 uses less fuel, and there is thus less unburned fuel in the effluent leaving the anode gas space and entering the burner 36. Of course less heat is required to be generated by the reactor burner 36 at part power. Therefore, less air from the air box 25 is necessary in the burner 36 during part power. If the excess air being pumped out by the compressor 38 is passed through the burner 36 it will be necessary for the burner to heat up all that air in order that the burner temperature is at the proper level. This would require additional fuel to the burner and result in high inefficiencies.

In the present embodiment bypass valve 27 is responsive to the current produced by the fuel cell. At full power all the air from the compressor 38 passes into the air box 25. As the power is reduced the valve 27 opens to bypass part of the air around the stack 12 via bypass leg 72. This bypassed air combines with the effluent from the burner 36 and the effluent from the cathode gas space 30 and flows through the turbine 40. Thus, the mass flow through the turbine 40 is not significantly reduced at part power. Although the temperature of the effluent from the cathode gas space and the temperature of the effluent from the burner 36 may be the same at part power, due to their reduced mass they contain less heat. An auxiliary burner 74 is disposed in the bypass leg 72 and heats the bypass air to a sufficient temperature such that when it is combined with the other effluent gas streams the temperature of the combined stream entering the turbine will be about the same as at full power. If there were no auxiliary burner 74 then the bypass air would reduce the temperature of the gases entering the turbine 40 which would in turn reduce the speed of the turbine 40 and, in turn, the mass flow and pressure of the air leaving the compressor 38. The burner 74 is supplied with fuel via conduit 76 from the same source as the fuel for the reactor 34. A valve 78 controls the amount of fuel flow to the burner 74 and may be responsive to any of a number of variables in the system in order to arrive at the proper temperature of the gases entering the turbine 40.

If desired, the auxiliary burner could be positioned anywhere downstream of the bypass leg 72 as long as the bypassed air passes therethrough on its way to the turbine 40. For example, it may be disposed in conduit 52 as indicated by the box 80 is dashed outline. However, there is a more dilute concentration of oxygen in the gases flowing into the box 80 since the bypass air has now been mixed with various effluent gases which are generally deplete in oxygen. It is thus much easier and more economical to burn in the bypass leg 72. Also, although in this embodiment the auxiliary burner is run on raw fuel, it would be just as feasible to run it on processed fuel which could be bled from conduit 70. This, however, might require that additional fuel be fed to the reactor 34 to compensate for the amount of fuel used by the auxiliary burner.

In order to more fully appreciate and understand the advantages and operation of the present invention consider the graph of FIG. 3 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{H_2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled one atmosphere in FIG. 3 represents cell performance at a particular hydrogen utilization and oxygen utilization. The solid curve labeled 3.5 atmospheres represents cell performance at the same reactant utilization ratio. Also, the cells represented by each of these curves is assumed to be operating at the same temperature. The well known Tafel equation states that there will be an increase in cathode performance (i.e., and increase in voltage) when the partial pressure of oxygen increases. This equation is set forth below.

$$\Delta V_{cathode} = K(\text{mv}) \log \left[ \frac{P_{O_2}}{P_{O_2(ref)}} \right] \quad (1)$$

where K is a constant. The Nernst equation states that there will be an increase in anode performance (i.e., an increase in cell voltage) when the partial pressure of hydrogen is increased. The Nernst equation is set forth below.

$$\Delta V_{anode} = C(\text{mv}) \ln \left[ \frac{P_{H_2}}{P_{H_2(ref)}} \right] \quad (2)$$

where C is a constant. It is apparent that for constant temperature and for constant utilization, an increase in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} . \quad (3)$$

The left hand side of equation (3) is illustrated by the graph of FIG. 3 as the difference in voltage between points A and B at constant current density. Further, from the graph of FIG. 3, it can be seen that by operating at reactant pressures of 3.5 atmospheres the cell size may be decreased without decreasing the cell voltage output such as by operating at point C.

The dotted curves on the graph of FIG. 3 are also representative of cell performance at one and 3.5 atmospheres of reactant pressure, respectively, as labeled. These curves represent the performance of cells similar in all respects to cells represented by the solid curves except that the cells have been designed for higher reactant utilization. Note that at 3.5 atmospheres the cell can run at a higher reactant utilization and still show improvement over the prior art such as an increase in cell voltage by operation at point B' or an increase in current density (i.e., a decrease in cell size) for the same cell voltage by operating at point C'. On the other hand, notice that for a cell using reactants at atmospheric pressure an increase in utilization means either increasing the size of the cell to maintain the same cell voltage or taking a voltage loss in order to maintain the same cell size. The importance of the ability to operate at higher hydrogen utilization without sacrificing performance or increasing the size of the cell will become apparent in the hereinafter set forth discussion relating to the operation of the steam reformer reactor 34 of the power plant of the preferred embodiment.

In prior art phosphoric acid electrolyte fuel cells operating over 300°F and at atmospheric pressures evaporation of the phosphoric acid electrolyte occurs. The effect of acid evaporation is to require that acid be added regularly during the lifetime of the power plant. Acid evaporation is a function of the mass flow rate of air through the cathode gas space, the partial pressure of acid, and the total gas pressure in the cathode gas space according to the following relationship:

$$\text{Acid loss} = f\left\{\text{flow rate} \times \frac{\text{vapor pressure of acid}}{\text{total pressure}}\right\} \quad (4)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also, due to the higher reactant pressures fuel cells incorported in power plants of the present invention may be run at higher oxygen utilizations, and therefore the flow rate of air through the cathode gas space is lower and acid loss is further reduced. It has been determined that the foregoing factors combined reduce acid loss by an order of magnitude.

A graph representative of a steam reformer reactor performance is shown in FIG. 4. Reformer efficiency ($\eta_R$) is plotted on the vertical axis and the flow rate of the processed gas stream ($\dot{W}$) divided by the heat transfer area of the reactor ($A_{h.t.}$) is plotted on the horizontal axis. Since the term $A_{h.t.}$ is directly related to the size of the reactor, reformer size decreases when moving to the right along the horizontal axis. Reformer efficiency is defined by the following equation:

$$\eta_R = (K) U_{H_2}(\alpha \cdot \beta) \quad (5)$$

where K is a constant, $U_{H_2}$ is hydrogen utilization in the fuel cell, and the product ($\alpha \cdot \beta$) is fuel conversion in the reactor. Fuel conversion ($\alpha \cdot \beta$) is the percent of carbon in the incoming fuel which is converted to $CO_2$. It is representative of the amount of hydrogen in the steam reforming reaction. Shown in the graph of FIG. 4 are 90 75% fuel conversion curves along with a hydrogen utilization curve labeled $U_{H_2}$ and a hydrogen utilization curve labeled $U'_{H_2}$, the latter representing a higher hydrogen utilization. For the purposes of comparison assume that $U_{H_2}$ is the same hydrogen utilization as represented by the solid curves in FIG. 3 and that $U'_{H_2}$ is the hydrogen utilization represented by the dotted curves of FIG. 3. As discussed with reference to FIG. 3, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally, in order to keep reformer size within reasonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U'_{H_2}$. This permits the use of a smaller steam reformer reactor without sacrificing efficiency because the reformer can be run at a lower fuel conversion. This operating point is labeled E in FIG. 4. Of course, if desired, reactor size can be kept the same and reformer efficiency can be greatly improved such as by operating at point F. It is important to note that although there is some loss in fuel cell performance when operating at higher reactant utilizations (see FIG. 3) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

In the preferred embodiment it is contemplated that naphtha will be used as the fuel and that the steam reformer reactor 34 will be of the well known type which utilizes a nickel catalyst. The reactor could, however, be any conventional apparatus for generating hydrogen. For example, although less efficient than a steam reformer reactor, a partial oxidation hydrogen generator may be used and will benefit significantly by the higher reactant gas pressures. In certain instances fuel conditioning apparatus may not even be required, such as if pure hydrogen is available for use as fuel for the stack.

As heretofore mentioned, a power plant designed according to the present invention can operate using a condenser considerably smaller than the condensers of prior art fuel cell power plants. At a constant current there is a constant amount of water produced by the fuel cell according to Faraday's law. This water leaves the cell in the cathode effluent gas stream. The steam reformer reaction is known to require a certain amount of water which, in the prior art, as in the present invention, is obtained at least in part from the cathode gas stream. This water is removed from the cathode gas stream by a condenser. In prior art phosphoric acid electrolyte power plants wherein the gas stream is at atmospheric pressure the dew point of the stream is so low that in order to condense out a sufficient amount of water to run the stream reformer reaction the temperature of the gas stream leaving the condenser must necessarily be only a few degrees higher than the ambient cooling air.

Accordingly, very large condensers are required. As heretofore stated the condensers are the largest components of prior art fuel cell power plants. In pressurized power plants according to the present invention the dew point of the gas stream leaving the cathode gas space will be considerably higher than in the prior art due to the higher pressure of gas stream. For example, the dew point of a gas stream leaving a 300°F stack at 45 psia would be about 60°F higher than the dew point of a gas stream leaving a 300°F stack at atmospheric pressure. This means that to condense out the same amount of water the temperature of the gas stream need not be reduced to as low as level as in unpressurized systems. In other words there will be significant difference between the temperature of the condenser cooling air and the temperature of the gas stream leaving the condenser. Assuming the pressurized and unpressurized systems both use 90°F cooling air, it is estimated that the condenser size may be reduced by a factor of about two or three. The reduction in the required size of the condenser equipment at all power levels is one of the major advantages of the present invention and helps to significantly reduce cost and the size of the power plant.

Although the invention has been shown and described with respect to a preferred embodiment thereof, it should be understood by those skilled in the art other various changes and omissions in the form and detail thereof may be made therein without departing from the spirit and the scope of the invention.

Having thus described a typical embodiment of my invention, that which I claim as new and desire to secure by Letters Patent of the United States is:

1. A power plant for generating electricity comprising:
   a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
   compressor means including a compressor operably connected to turbine means for compressing air to greater than 2 atmospheres pressure;
   means for delivering air at a pressure of at least 2 atmospheres from said compressor into said cathode gas space;
   fuel conditioning apparatus including reactor means for producing hydrogen from a hydrogen containing fuel;
   burner means for providing heat to said reactor means;
   means for delivering pressurized hydrogen containing fuel into said reactor means;
   means for delivering pressurized hydrogen from said fuel conditioning apparatus into said anode gas space;
   means for delivering anode effluent gases into said burner means for providing fuel to said burner means;
   means for bypassing, at part power, a portion of the compressed air from said compressor around said cathode gas space;
   means for delivering effluent gases from said cathode gas space, effluent gases from said burner means, and said bypassed compressed air into said turbine means for powering said turbine means and driving said compressor; and
   auxiliary burner means in heat exchange relationship with said gases being delivered into said turbine means, for adding additional heat to the gases being delivered into said turbine means.

2. The power plant according to claim 1 wherein said means for bypassing compressed air around said cathode gas space includes a bypass leg, and said auxiliary burner means is disposed in said bypass leg for burning said bypassed air therein.

3. The power plant according to claim 1 wherein said electrolyte is an acid electrolyte.

4. The power plant according to claim 1 wherein said electrolyte is phosphoric acid.

5. The power plant according to claim 1 wherein said reactor means is a steam reforming reactor and said burner means is a reactor burner.

6. The power plant according to claim 5 wherein said means for delivering air from said compressor into said cathode gas space includes means for delivering air from said compressor into said burner means.

7. The power plant according to claim 1 wherein said compressor and said turbine means is of fixed geometry.

8. The power plant according to claim 1 wherein said means for bypassing around said cathode gas space includes means for bypassing around said burner means.

9. The power plant according to claim 8 wherein said auxiliary burner means is disposed in said power plant such that the bypassed compressed air flows therethrough and is burned therein.

10. A power plant for generating electricity comprising:
    a fuel cell stack including a plurality of fuel cells connected electrically in series through a load, each cell comprising a cathode electrode, an anode electrode, and acid electrolyte disposed therebetween, a cathode gas space on the nonelectrolyte side of said cathode electrode and an anode gas space on the nonelectrolyte side of said anode electrode;
    fuel conditioning apparatus including a steam reforming reactor for producing hydrogen and a reactor burner for providing heat to said reactor;

condenser means;

boiler means;

turbocharger means including a compressor for compressing air to greater than 2 atmospheres pressure and a turbine operably connected to said compressor for driving said compressor;

auxiliary burner means;

fuel supply means including a hydrogen containing fuel;

means for delivering compressed air at greater than 2 atmospheres pressure from said turbocharger means into said cathode gas space;

means for delivering the effluent from said cathode gas space into said condenser means for condensing out the water therein;

means for delivering the condensed out water from said condenser means to said boiler means for converting said water to steam;

means for delivering pressurized steam from said boiler means and pressurized hydrogen containing fuel from said fuel supply means into said steam reforming reactor;

means for delivering pressurized hydrogen from said fuel conditioning apparatus into said anode gas space;

means for delivering anode effluent gases into said reactor burner;

means for delivering compressed air from said turbocharger means into said reactor burner;

means for bypassing, at part power, a portion of the compressed air from said turbocharger means around said cathode gas space and around said fuel conditioning apparatus including means for combining said bypassed compressed air with the effluent gases from said reactor burner and the effluent gases from said cathode gas space;

means for delivering the combined gases into said turbine; and means for delivering fuel into said auxiliary burner means, said auxiliary burner means being disposed in said power plant such that the bypassed compressed air flows therethrough and is burned therein for adding heat to the gases entering said turbine.

11. The power plant according to claim 10 wherein said means for bypassing a portion of the compressed air includes a bypass leg and said auxiliary burner means is disposed in said bypass leg.

12. The power plant according to claim 10 wherein said compressor and said turbine is of fixed geometry.

13. The power plant according to claim 10 wherein said boiler means is disposed in heat exchange relationship with said fuel cell stack wherein heat from said stack is used to convert the water in said boiler to steam.

14. In the process for generating electricity in a power plant comprising fuel conditioning apparatus including reactor means, a compressor operably connected to turbine means, and a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode, the steps of:

compressing air to greater than 2 atmospheres in said compressor;

delivering compressed air at greater than 2 atmospheres pressure from said compressor into said cathode gas space;

delivering pressurized hydrogen containing fuel into said reactor means;

producing hydrogen in said reactor means;

providing heat for said step of producing hydrogen by burning anode effluent gases in a burner;

delivering pressurized hydrogen from said fuel conditioning apparatus into said anode gas space;

bypassing, at part power, a portion of the compressed air from said compressor around said cathode gas space and around said fuel conditioning apparatus;

burning said bypassed air in an auxiliary burner; and delivering effluent gases from said cathode gas space, said burner, and said auxiliary burner into said turbine means for driving said compressor.

15. The process according to claim 14 wherein said step of producing hydrogen includes steam reforming said hydrogen containing fuel.

16. The process according to claim 14 including the step of delivering said cathode effluent gases and said burner effluent gases into said auxiliary burner along with said bypassed air before delivering them into said turbine.

17. The process according to claim 15 including the steps of:

condensing water out of the effluent gases from said cathode gas space;

converting said water to pressurized steam; and delivering said steam into said steam reforming reactor.

* * * * *